United States Patent
Maab et al.

(10) Patent No.: US 11,926,758 B2
(45) Date of Patent: Mar. 12, 2024

(54) POLYTRIAZOLE COATING MATERIALS FOR METAL SUBSTRATES

(71) Applicant: Saudi Arabian Oil Company, Dhahran (SA)

(72) Inventors: Husnul Maab, Dhahran (SA); Nayef M. Alanazi, Dhahran (SA); Turki A. Al-Khaldi, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 613 days.

(21) Appl. No.: 17/140,678

(22) Filed: Jan. 4, 2021

(65) Prior Publication Data
US 2022/0017774 A1 Jan. 20, 2022

Related U.S. Application Data

(63) Continuation of application No. 16/931,576, filed on Jul. 17, 2020, now abandoned.

(51) Int. Cl.
C09D 179/06 (2006.01)

(52) U.S. Cl.
CPC ................... C09D 179/06 (2013.01)

(58) Field of Classification Search
None
See application file for complete search history.

(56) References Cited

U.S. PATENT DOCUMENTS

| 3,773,544 A | 11/1973 | Newton et al. |
|---|---|---|
| 4,119,593 A | 10/1978 | Smith et al. |
| 4,740,568 A * | 4/1988 | Katritzky ........... C08G 73/0605 528/73 |
| 5,698,663 A | 12/1997 | Kinneberg |
| 5,837,032 A | 11/1998 | Moll et al. |
| 5,959,058 A | 9/1999 | Tonelli et al. |
| 6,503,295 B1 | 1/2003 | Koros et al. |

(Continued)

FOREIGN PATENT DOCUMENTS

| AT | 441688 T | 9/2009 |
|---|---|---|
| AT | 527303 T | 10/2011 |

(Continued)

OTHER PUBLICATIONS

Hensema—gas separation polytriazole membranes—Gas Sep & Purif.—1994 (Year: 1994).*

(Continued)

*Primary Examiner* — John Vincent Lawler
(74) *Attorney, Agent, or Firm* — Dinsmore & Shohl LLP

(57) ABSTRACT

Coated substrates include a metal substrate and a polytriazole polymer applied to a surface of the metal substrate. The polytriazole polymer may include substituted phenyls, substituted benzyls, or both substituted phenyls and substituted benzyls. The substituted phenyls and the substituted benzyls may be independently substituted with hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy groups. The polytriazole polymer may have a degree of polymerization from 50 to 400.

20 Claims, 1 Drawing Sheet

(56) References Cited

U.S. PATENT DOCUMENTS

| | | |
|---|---|---|
| 6,911,512 B2 | 6/2005 | Jing et al. |
| 7,208,243 B2 | 4/2007 | Li et al. |
| 7,691,515 B2 | 4/2010 | Li et al. |
| 7,745,512 B2 | 6/2010 | Xia et al. |
| 7,872,071 B2 | 1/2011 | Berthold et al. |
| 7,989,579 B2 | 8/2011 | Ponce et al. |
| 8,026,337 B2 | 9/2011 | Ponce et al. |
| 8,309,228 B2 | 11/2012 | Dierdorf et al. |
| 8,415,447 B2 | 4/2013 | Rydin et al. |
| 8,679,632 B2 | 3/2014 | Smith |
| 8,816,003 B2 | 8/2014 | Liu et al. |
| 8,911,840 B2 | 12/2014 | Leiden et al. |
| 9,233,344 B1 | 1/2016 | Liu et al. |
| 9,403,120 B2 | 8/2016 | He et al. |
| 9,718,031 B2 | 8/2017 | Ma et al. |
| 9,751,053 B2 | 9/2017 | Liu et al. |
| 10,053,598 B2 | 8/2018 | Yalcin et al. |
| 2006/0154129 A1 | 7/2006 | Li et al. |
| 2007/0155953 A1 | 7/2007 | Li et al. |
| 2008/0182964 A1* | 7/2008 | Ponce ............... H01M 8/1081 528/347 |
| 2008/0193652 A1* | 8/2008 | De Figueiredo Gomes ............... C09D 5/08 427/299 |
| 2008/0317946 A1 | 12/2008 | Chen |
| 2009/0318620 A1 | 12/2009 | Liu et al. |
| 2010/0043906 A1 | 2/2010 | Jackson et al. |
| 2010/0168376 A1 | 7/2010 | Ponce et al. |
| 2010/0270234 A1 | 10/2010 | Liu et al. |
| 2010/0326273 A1 | 12/2010 | Liu et al. |
| 2011/0071268 A1 | 3/2011 | Hays et al. |
| 2012/0322911 A1 | 12/2012 | Liu et al. |
| 2012/0323059 A1 | 12/2012 | Liu et al. |
| 2013/0206694 A1* | 8/2013 | Nunes ............... B01D 69/148 210/500.28 |
| 2015/0368496 A1 | 12/2015 | Hawig |
| 2016/0089640 A1 | 3/2016 | Liu et al. |
| 2016/0303521 A1 | 10/2016 | Chakraborty et al. |
| 2016/0329534 A1 | 11/2016 | Flynn et al. |
| 2017/0157555 A1 | 6/2017 | Karode et al. |
| 2017/0157556 A1 | 6/2017 | Karode et al. |
| 2017/0157557 A1 | 6/2017 | Ding et al. |
| 2017/0327677 A1 | 11/2017 | Neuteboom et al. |
| 2020/0070107 A1 | 3/2020 | Maab et al. |

FOREIGN PATENT DOCUMENTS

| | | |
|---|---|---|
| CA | 2619814 A1 | 7/2008 |
| CA | 2620696 A1 | 8/2008 |
| CN | 101235147 A | 8/2008 |
| CN | 101244416 A | 8/2008 |
| CN | 102558555 A | 7/2012 |
| DE | 102007005666 A1 | 8/2008 |
| DE | 102007007879 A1 | 8/2008 |
| DE | 102008024344 A1 | 12/2008 |
| DK | 1953186 T3 | 1/2010 |
| EP | 1953186 A1 | 8/2008 |
| EP | 1978052 A1 | 10/2008 |
| EP | 2236542 A1 | 10/2010 |
| EP | 2626127 A2 | 8/2013 |
| EP | 2667441 A1 | 11/2013 |
| GR | 1006508 B | 9/2009 |
| JP | 2008522014 A | 6/2008 |
| JP | 2008189921 A | 8/2008 |
| JP | 2008194687 A | 8/2008 |
| JP | 20098004367 A | 1/2009 |
| JP | 2011168779 A | 9/2011 |
| KR | 20060023450 A | 3/2006 |
| KR | 20080071935 A | 8/2008 |
| WO | 9404253 A2 | 3/1994 |
| WO | 2006060556 A2 | 6/2006 |

OTHER PUBLICATIONS

Yanpeng E+Wan—polytriazole adhesives-metal—J.Adhes.Sci.Tech—2013 (Year: 2013).*

Chisca—crosslinked polytriazole membranes—PCT D1 for earlier case—IDS—2017 (Year: 2017).*

Ma—high impact polytriazole resins—Designed Monomers & Poly.—2020 (Year: 2020).*

Chisca et al., "Crosslinked copolyazoles with a zwitterionic structure for organic solvent resistant membranes", Polym. Chem., vol. 6, pp. 543-554, 2015.

Chisca et al., "Crosslinked polytriazole membranes for organophilic filtration", Journal of Membrane Science, vol. 528, pp. 264-272, 2017.

Gomes et al., "Synthesis and characterization of flexible polyoxadiazole films through cyclodehydration of polyhydrazides", Polymer, vol. 44, pp. 3633-3639, 2003.

Hensema et al., "Polyoxadiazoles and polytriazoles as new heat and solvent resistant membrane materials", Bull. Soc. Chim. Belg, vol. 100, No. 2, pp. 129-136, 1991.

Hensema et al., "Gas separation properties of new polyoxadiazole and polytriazole membranes", Gas Separation & Purification, vol. 8, No. 3, pp. 149-160, 1994.

Hensema et al., "Polymeric Gas Separation Membranes", Advanced Materials, vol. 6, No. 4, 1994.

Maab et al., "Synthesis and fabrication of nanostructured hydrophobic polyazole membranes for low-energy water recovery", Journal of Membrane Science, vol. 423-424, pp. 11-19, 2012.

Maab et al., "Porous polyoxadiazole membrantes for harsh environment", Journal of Membrane Science, vol. 445, pp. 127-134, 2013.

Maab et al., "Polyazole Hollow Fiber Membranes for Direct Contact Membrane Distillation", Industrial & Engineering Chemistry Research, vol. 52, pp. 10425-10429, 2013.

Matar et al., "Temporal Changes in Extracellular Polymeric Substances on Hydrophobic and Hydrophilic Membrane Surfaces in a Submerged Membrane Bioreactor", Water Research, vol. 95, pp. 27-38, 2016.

Mirza et al., "Surface Coatings on Steel Pipes Used in Oil and Gas Industries—A Review", American Chemical Science Journal, 13(1): 1-23, Article No. ACSJ.22790, 2016.

Perepelkin et al., "Highly Heat-Resistant Polyoxadiazole Fibres and Arselon Filament: Principles of Manufacture, Properties, and Use. An Analytical Review", Chemistry and Technology of Chemical Fibres, Fibre Chemistry, vol. 40, No. 5, pp. 406-414, 2008.

Robeson, "Correlation of separation factor versus permeability for polymeric membranes", Journal of Membrane Science, vol. 62, pp. 165-185, 1991.

Robeson, "The upper bound revisited", Journal of Membrane Science, vol. 320, pp. 390-400, 2008.

Schulz et al., "Aromatic Poly(1,3,4-oxadiazole)s AS Advanced Materials", Advanced Materials, vol. 9, No. 8, 1997.

Gebben et al., "Gas Separation Properites of Thermally Stable and Chemically Resistant Polytriazole Membrane", Journal of Membrane Science, Elsevier BV, NL, vol. 46, No. 1, Sep. 1, 1989.

International Search Report and Written Opinion dated May 24, 2019 pertaining to International Application No. PCT/US2018/060650, 17 pgs.

Notice of Allowance and Fee(s) Due dated Oct. 15, 2020 pertaining to U.S. Appl. No. 16/114,676, filed Aug. 28, 2018, 27 pgs.

* cited by examiner

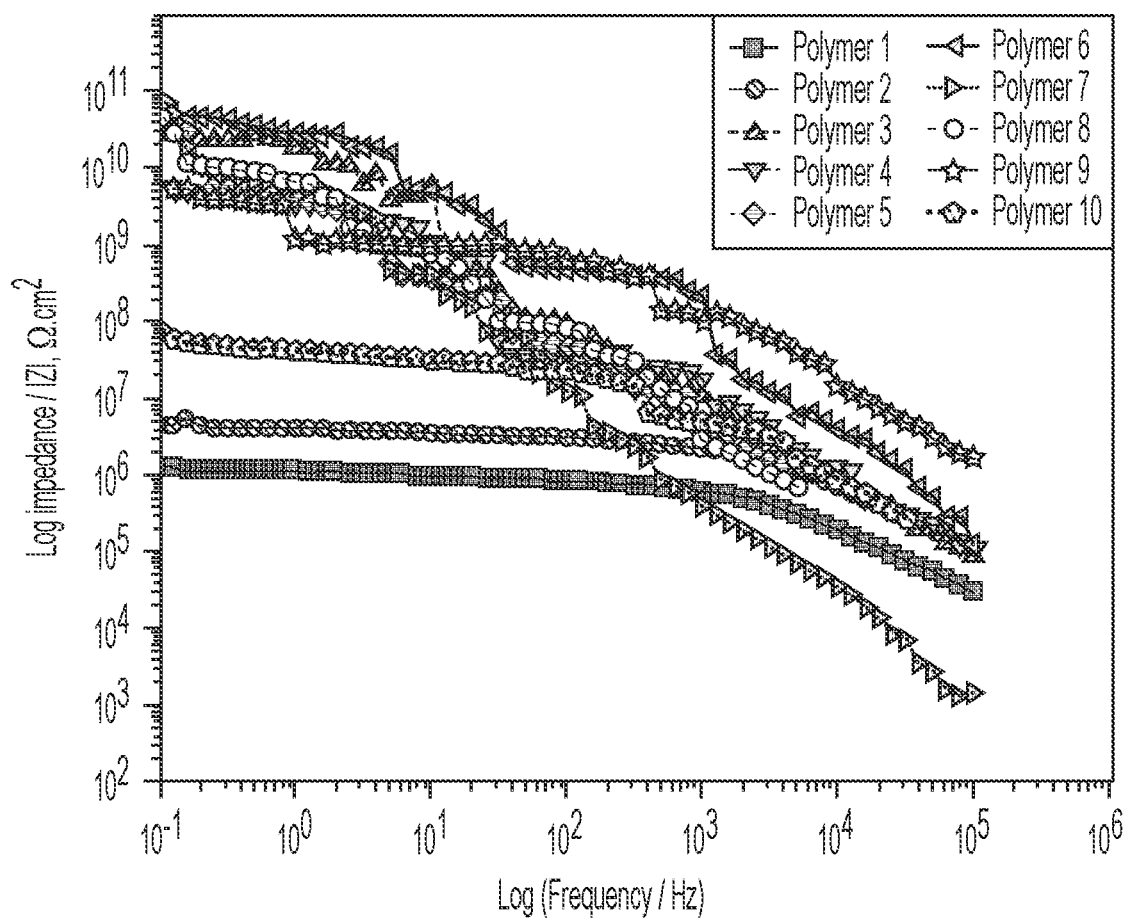

POLYTRIAZOLE COATING MATERIALS FOR METAL SUBSTRATES

CROSS-REFERENCE TO RELATED APPLICATION

This application is a continuation of U.S. patent application Ser. No. 16/931,576, filed Jul. 17, 2020, the entire disclosure of which is hereby incorporated herein by reference.

BACKGROUND

Field

The present specification generally relates to coating materials for metal substrates, and more particularly to polytriazole polymer materials suitable for coating the surface of metal substrates.

Technical Background

Corrosion is a natural process that converts materials, such as metal substrates, into a more chemically stable form, such as oxide, hydroxide, or sulfide. If left untreated, corrosion gradually destroys the metal substrate through chemical or electrochemical reactions. The corrosion rate of the metal substrate may vary with time depending on environmental conditions such as temperature, pressure, alkalinity, humidity, and salinity. Corrosion may occur when the metal substrate is exposed to harsh environments, such as those typically associated with the hydrocarbon production process.

A metal substrate may be coated in order to slow or prevent corrosion. Common coatings may include, for example, epoxy coatings, polyurethane, polyvinyl chloride, chlorinated rubber, and polyethylene. However, these coatings often include binders, additives, and fillers that may affect corrosion resistance performance or result in instability under certain conditions. Accordingly, there are ongoing needs for coating materials suitable for coating metal substrates. Such coating materials should exhibit increased thermal stability, corrosion resistance (for example, impedance), and surface hydrophobicity when applied to a metal substrate while also being substantially free from binders, additives, and fillers.

SUMMARY

According to some embodiments of this disclosure, a coated substrate includes a metal substrate and a polytriazole polymer on a surface of the metal substrate. The polytriazole polymer includes a structure according to formula (I):

methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, or difluoromethoxy. Further, in formula (I), subscripts m and n represent monomer mole fractions in the polytriazole polymer. In embodiments, subscript m may be from 0 to 1, subscript n may be from 0 to 1, and the sum (m+n) may be 1. In some embodiments, the polytriazole polymer may have a degree of polymerization from 50 to 400.

Additional features and advantages of the embodiments of this disclosure will be set forth in the detailed description that follows, and in part will be readily apparent to those skilled in the art from that description or recognized by practicing the embodiments of this disclosure, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawing illustrates the various embodiments described in the present disclosure, and together with the description serve to explain the principles and operations of the claimed subject matter.

BRIEF DESCRIPTION OF THE DRAWING

The FIGURE is a graph of impedance of various polytriazole polymer coatings, according to embodiments, over a frequency range of 0.01 Hz to $10^5$ Hz.

DETAILED DESCRIPTION

Polymeric coatings are commonly applied to metal substrates to prevent corrosion in harsh environments. Properties of polymeric coatings are, in general, environmentally dependent, and as a result, polymer coatings may have uneven performance when subjected to harsh environmental factors. Various polymeric coatings have received considerable attention as special coating materials for metal substrates. However, such polymeric coating materials often require binders, additives, and fillers that may affect corrosion resistance performance or that may result in instability under harsh conditions.

The polytriazole polymer coating materials according to embodiments of this disclosure may be applied to metal substrates to prevent corrosion of the metal substrates in harsh environments, including but not limited to conditions typically associated with various production processes. The

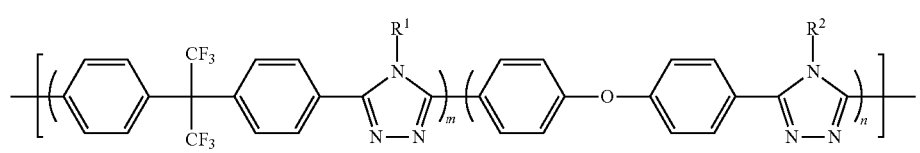

In formula (I), each $R^1$ and each $R^2$ may be phenyl groups (—$C_6H_5$) or benzyl groups (—$CH_2C_6H_5$) in which at least one hydrogen atom of the phenyl group or the benzyl group is substituted with bromo, fluoro, chloro, iodo, hydroxy, metal substrates may include natural metals and refined metals, such as metal alloys, which may be incorporated into a variety of industrial fields. For example, the metal substrates may be used to form metal pipelines and storage vessels for uses typically associated with hydrocarbon production processes. Once coated with the polytriazole polymer, as described according to the present application, the metal substrates exhibit increased thermal stability, corrosion resistance (for example, impedance), and surface hydrophobicity compared to other polymeric coatings, without requiring the inclusion of binders, additives, and fillers.

In general, polytriazole polymer coatings, as described in the present application, protect metal substrates from corrosion because the coatings exhibit increased impedance at high frequencies. The impedance of a polymer coating applied to a metal substrate correlates to the rate at which the metal substrate would corrode in harsh conditions. For example, an impedance of a coating greater than $10^6$ ohms per square centimeter ($\Omega/cm^2$) at a frequency of 1,000 Hertz (Hz) may strongly indicate desirable corrosion resistance of the coating, even under harsh conditions, such as those typically associated with hydrocarbon production processes. As a result, the polytriazole polymer coatings for metal substrates according to embodiments described in the present disclosure have corrosion resistance characteristics for use in various commercial applications in which corrosion resistance is desired.

According to embodiments of this disclosure, coatings applied to metal substrates include polymer materials with corrosion resistance to the metal substrate even under harsh conditions, such as those associated with hydrocarbon production processes.

Accordingly, reference will now be made in detail to embodiments of coated substrates that include a metal substrate and a polytriazole polymer on a surface of the metal substrate, in which the polytriazole polymer increases corrosion resistance of the metal substrate. Embodiments of systems incorporating the polytriazole polymer coatings, and methods for coating metal substrates incorporating the polytriazole polymers, will be disclosed subsequently.

Polytriazole polymers and coatings of the polytriazole polymers applied to a surface of a metal substrate will now be described. The polytriazole polymers, according to embodiments, include fluorinated diphenylmethane polytriazole polymers, diphenyl ether polytriazole polymers, and copolymers of these. It should be understood that in all representations of chemical structures in this disclosure, a wavy line drawn perpendicularly to a bond denotes a connection point of the chemical structure with another chemical structure or functional group and implies that the bond broken by the wavy line extends to another atom not shown in the representation.

In embodiments, the polytriazole polymer may include a polytriazole polymer or copolymer according to general formula (I):

the subscript m may be 0, 0.1, 0.2, 0.3, 0.4, 0.5, 0.6, 0.7, 0.8, 0.9, or 1. The subscript n of formula (I) denotes the mole fraction of the diphenyl ether polytriazole monomers present in the polytriazole polymer of formula (I), where n is from 0 to 1. In embodiments, the subscript n may be 0, 0.1, 0.2, 0.3, 0.4, 0.5, 0.6, 0.7, 0.8, 0.9, or 1. In one or more embodiments, subscript m may be from 0.4 to 0.6 and subscript n may be from 0.4 to 0.6. In embodiments, the sum (m+n) equals 1. Regardless of the mole fractions of subscripts m and n present in formula (I), the polytriazole polymer may have a degree of polymerization from 50 to 400.

Groups $R^1$ and $R^2$ of the polytriazole polymer may be independently selected from substituted phenyls according to formula (a) and substituted benzyls according to formula (b):

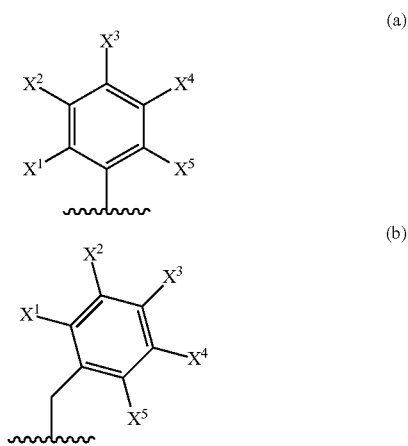

In formulas (a) and (b), $X^1$, $X^2$, $X^3$, $X^4$, and $X^5$ may be independently selected from hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy, provided at least one of $X^1$, $X^2$, $X^3$, $X^4$, or $X^5$ is not hydrogen.

As used throughout this disclosure, the terms "independently chosen from" and "independently selected from" mean that for multiple instances of a variable group in a particular chemical structure or moiety, the identity of each individual instance does not depend on the identity of any other individual instance, subject only to any exceptions or provisos that are explicitly stated.

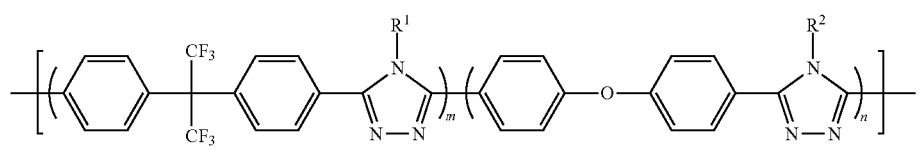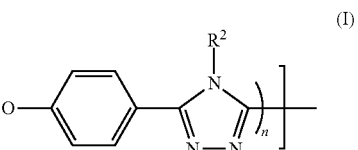

(I)

In formula (I), $R^1$ and $R^2$ may be independently selected from substituted phenyls or benzyls, which will be subsequently described in detail. The subscript m of formula (I) denotes the mole fraction of the fluorinated diphenylmethane polytriazole monomers present in the polytriazole polymer of formula (I), where m is from 0 to 1. In embodiments, In embodiments, in each $R^1$ and each $R^2$, exactly one of $X^1$, $X^2$, $X^3$, $X^4$, and $X^5$ may be bromo, fluoro, chloro, iodo, hydroxy, methyl, trifluoromethyl, dimethylamino, tert-butyl, carboxyl, triphenylmethyl, tris(4-fluorophenyl)methyl, tris (4-methylphenyl)methyl, (4-hydroxyphenyl)diphenylmethyl, or difluoromethoxy, and the remaining four of $X^1$, $X^2$, $X^3$, $X^4$, and $X^5$ may be hydrogen.

In one or more embodiments, in each $R^1$ and each $R^2$, exactly two of $X^1$, $X^2$, $X^3$, $X^4$, and $X^5$ may be independently selected from bromo, fluoro, chloro, iodo, hydroxy, methyl, trifluoromethyl, dimethyl amino, tert-butyl, carboxyl, triphenylmethyl, tris(4-fluorophenyl)methyl, tris(4-methylphenyl)methyl, (4-hydroxyphenyl)diphenylmethyl, or difluoromethoxy, and the remaining three of $X^1$, $X^2$, $X^3$, $X^4$, and $X^5$ may be hydrogen.

In embodiments, in each $R^1$ and each $R^2$, exactly three of $X^1$, $X^2$, $X^3$, $X^4$, and $X^5$ may be independently selected from bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, or difluoromethoxy, and the remaining two of $X^1$, $X^2$, $X^3$, $X^4$, and $X^5$ may be hydrogen.

In one or more embodiments, in each $R^1$ and each $R^2$, $X^1$, $X^2$, $X^3$, $X^4$, and $X^5$ may be independently selected from the group consisting of hydrogen, bromo, chloro, and fluoro, provided at least one of $X^1$, $X^2$, $X^3$, $X^4$, or $X^5$ is not hydrogen.

In some embodiments, all groups $R^1$ in the polytriazole polymer are identical to each other, all groups $R^2$ in the polytriazole polymer are identical to each other and $R^1$ and $R^2$ are identical. In some embodiments, all groups $R^1$ in the polytriazole polymer are identical to each other, all groups $R^2$ in the polytriazole polymer are identical to each other, and $R^1$ and $R^2$ are different from each other. In some embodiments, the polytriazole polymer may include multiple different monomer units, varying with respect to different groups $R^1$, different $R^2$ groups, or both.

Non-limiting specific examples of $R^1$ and $R^2$ as substituted phenyls having formula (a) include 4-bromophenyl; 4-hydroxyphenyl; 4-fluorophenyl; 2,4-difluorophenyl; 2,5-difluorophenyl; 4-bromo-2,5-difluorophenyl; 4-bromo-2,6-difluorophenyl; 2-bromo-4-fluorophenyl; 2,6-dibromo-4-fluorophenyl; 3-chloro-5-fluorophenyl; 3-chloro-4-fluorophenyl; 4-fluoro-3-(trifluoromethyl)phenyl; 3-(trifluoromethyl)phenyl; 3,5-dibromo-4-methylphenyl; 3-bromo-4-methylphenyl; 2,4,6-trimethylphenyl; 4-tert-butylphenyl; 4-(dimethylamino)phenyl; 2,3,4,5,6-pentafluorophenyl; and 2,4,6-trifluorobenzyl; 3,4,5-trifluorobenzyl; 4-(trifluoromethyl)benzyl; 2,3,4-trifluorobenzyl; 4-fluorobenzyl; 3,5-(di-trifluoromethyl)benzyl; 2,4,6-trimethylbenzyl; 4-methylbenzyl; 4-carboxylbenzyl; 4-(triphenylmethyl)phenyl; 4-[tris(4-fluorophenyl)methyl]phenyl; 4-[tris(4-methylphenyl)methyl]phenyl; 4-[(4-hydroxyphenyl)diphenylmethyl]phenyl; 4-(triphenylmethyl)benzyl; 4-[tris(4-fluorophenyl)methyl]benzyl; 4-[tris(4-methylphenyl)methyl]benzyl; and 4-[(4-hydroxyphenyl)diphenylmethyl]benzyl.

In some embodiments of the polymer of formula (I), each $R^1$ and each $R^2$ may be independently selected from the group consisting of 4-bromophenyl; 4-fluorophenyl; 4-hydroxyphenyl; 4-bromo-2,5-difluorophenyl; 3-(trifluoromethyl)phenyl; 2,5-difluorophenyl; and 2,3,4,5,6-pentafluorophenyl.

In one or more embodiments of the polymer of formula (I), each $R^1$ and each $R^2$ may be independently selected from the group consisting of 4-bromophenyl; 4-fluorophenyl; 4-bromo-2,5-difluorophenyl; 3-(trifluoromethyl)phenyl; 2,5-difluorophenyl; and 2,3,4,5,6-pentafluorophenyl. In embodiments, $R^1$ may be 4-bromophenyl and $R^2$ may be 4-fluorophenyl.

According to embodiments, in formula (I), the polytriazole polymer may have a degree of polymerization from 50 to 400, from 100 to 400, from 150 to 400, from 200 to 400, from 250 to 400, from 300 to 400, from 350 to 400, from 50 to 350, from 50 to 300, from 50 to 250, from 50 to 200, from 50 to 150, from 50 to 100, from 60 to 350, from 75 to 300, from 90 to 250, from 100 to 200, or any other range from 50 to 400.

In embodiments, subscript m is zero, and the polytriazole polymer has a structure according to formula (II):

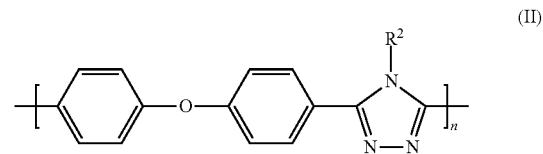

In formula (II), each $R^2$ may be a substituted phenyl according to formula (a) or a substituted benzyl according to formula (b), as previously defined with respect to formula (I). Likewise, in each group $R^2$ of a polytriazole polymer according to formula (II), each of $X^1$, $X^2$, $X^3$, $X^4$, and $X^5$ may be independently selected from hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy, provided at least one of $X^1$, $X^2$, $X^3$, $X^4$, or $X^5$ is not hydrogen. In embodiments, the polytriazole polymers of formula (II) may have a degree of polymerization from 300 to 400. In example embodiments in which the polytriazole polymer has a structure according to formula (II), each $R^2$ may be selected from the group consisting of 4-bromophenyl and 4-hydroxyphenyl, or each $R^2$ may be 4-bromophenyl, or each $R^2$ may be 4-hydroxyphenyl.

In further embodiments, subscript n is zero, such that the polytriazole polymer includes only diphenylmethyl triazole monomer units. Thus, when n is zero, the polytriazole polymer has a structure according to formula (III):

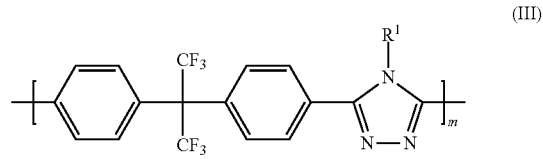

In formula (III), each $R^1$ may be a substituted phenyl according to formula (a) or a substituted benzyl according to formula (b), as previously defined with respect to formula (I). Likewise, in each group $R^2$ of a polytriazole polymer according to formula (III), each of $X^1$, $X^2$, $X^3$, $X^4$, and $X^5$ may be independently selected from hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy, provided at least one of $X^1$, $X^2$, $X^3$, $X^4$, or $X^5$ is not hydrogen. In embodiments, the polytriazole polymers of formula (III) may have a degree of polymerization from 50 to 200. In some embodiments in which the polytriazole polymer has a structure according to formula (III), each $R^1$ may be selected from the group consisting of 4-hydroxyphenyl; 4-fluorophenyl; 4-bromo-2,5-difluorophenyl; 3-(trifluoromethyl)phenyl; 2,5-difluorophenyl; and 2,3,4,5,6-pentafluorophenyl, or combinations thereof. In further embodiments, in which the polytriazole polymer has a structure according to formula (III), each $R^1$ may be 4-hydroxyphenyl, or each $R^1$ may be 4-fluorophenyl, or each $R^1$ may be 4-bromo-2,5-difluorophenyl, or each $R^1$ may be 3-(trifluoromethyl)phenyl, or each $R^1$ may be 2,5-difluorophenyl, or each $R^1$ may be 2,3,4,5,6-pentafluorophenyl, In some embodiments, subscript n is zero, such that the polytriazole polymer includes only diphenylmethyl triazole monomer units, and the polytriazole polymer is a copolymer of at least two different diphenylmethyl triazole monomer units. In such embodiments, the polytriazole polymer has a structure according to formula (IV):

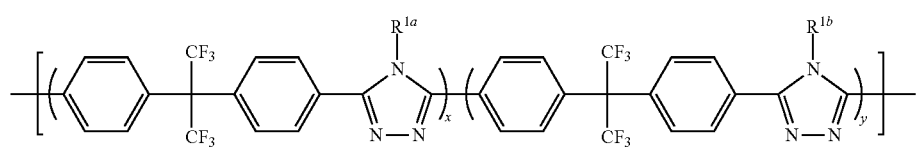

(IV)

In the polytriazole polymer according to formula (IV), each $R^{1a}$ and each $R^{1b}$ are groups $R^1$ as defined in formula (III), all groups $R^{1a}$ are identical, all groups $R^{2a}$ are identical, and $R^{1a}$ is different from $R^{1b}$. The subscript x represents the mole fraction of monomers including the group $R^{1a}$ in the polytriazole polymer. The subscript y represents the mole fraction of monomers including the group $R^{2a}$ in the polytriazole polymer. Regardless of the substituted phenyl chosen for $R^{1a}$ and $R^{1b}$, x+y=m. With reference to formula (I), of which the formula (IV) is a subset, m+n=1. Therefore, because n in formula (IV) is zero, x+y in formula (IV) also equals 1. In embodiments, the polytriazole polymer of formula (IV) may have a degree of polymerization from 50 to 100.

Non-limiting specific examples of $R^{1a}$ and $R^{1b}$ in formula (IV) as substituted phenyls having formula (a) include 4-bromophenyl; 4-hydroxyphenyl; 4-fluorophenyl; 2,4-difluorophenyl; 2,5-difluorophenyl; 4-bromo-2,5-difluorophenyl; 4-bromo-2,6-difluorophenyl; 2-bromo-4-fluorophenyl; 2,6-dibromo-4-fluorophenyl; 3-chloro-5-fluorophenyl; 3-chloro-4-fluorophenyl; 4-fluoro-3-(trifluoromethyl)phenyl; 3-(trifluoromethyl)phenyl; 3,5-dibromo-4-methylphenyl; 3-bromo-4-methylphenyl; 2,4,6-trimethylphenyl; 4-tert-butylphenyl; 4-(dimethylamino)phenyl; and 2,3,4,5,6-pentafluorophenyl. Non-limiting specific examples of $R^{1a}$ and $R^{1b}$ in formula (IV) as substituted benzyls having formula (b) include 2,4,6-trifluorobenzyl; 3,4,5-trifluorobenzyl; 4-(trifluoromethyl)benzyl; 2,3,4-trifluorobenzyl; 4-fluorobenzyl; 3,5-(di-trifluoromethyl)benzyl; 2,4,6-trimethylbenzyl; 4-methylbenzyl; 4-carboxylbenzyl; 4-(triphenylmethyl)phenyl; 4-[tris(4-fluorophenyl)methyl]phenyl; c; 4-[(4-hydroxyphenyl)diphenylmethyl]phenyl; 4-(triphenylmethyl)benzyl; 4-[tris(4-fluorophenyl)methyl]benzyl; 4-[tris(4-methylphenyl)methyl]benzyl; and 4-[(4-hydroxyphenyl)diphenylmethyl]benzyl.

In some embodiments, $R^{1a}$ and $R^{1b}$ may be independently selected from the group consisting of 4-bromophenyl; 4-fluorophenyl; 4-hydroxyphenyl; 4-bromo-2,5-difluorophenyl; 3-(trifluoromethyl)phenyl; 2,5-difluorophenyl; and 2,3,4,5,6-pentafluorophenyl. In further embodiments, $R^{1a}$ and $R^{1b}$ may be independently selected from the group consisting of 4-bromophenyl; 4-fluorophenyl; 4-bromo-2,5-difluorophenyl; 3-(trifluoromethyl)phenyl; 2,5-difluorophenyl; and 2,3,4,5,6-pentafluorophenyl. In specific embodiments, $R^{1a}$ may be 4-bromophenyl and $R^{1b}$ may be 4-fluorophenyl.

The polytriazole polymers may be prepared by following any suitable synthetic strategy. In some instances, the polytriazole polymer coatings described in the present disclosure are prepared by a polycondensation reaction. In an exemplary polycondensation route, hydrazine sulfate and polyphosphoric acid (PPA) are mixed with 4,4'-(hexafluoroisopropylidene)bis(benzoic acid), 4,4'-oxybis(benzoic acid), or combinations thereof, under an inert atmosphere such as $N_2$ gas. The mixture is vigorously stirred for 3 hours at 160 degrees Celsius (° C.) to form a viscous polymer. The resulting viscous polymer is then precipitated into 5 liters of 1 molar sodium hydroxide (NaOH) solution and washed in de-ionized water at 80° C. for 12 hours to form precipitated polyoxadiazole fibers. The precipitated polyoxadiazole fibers are collected by filtration and vacuum dried at 110° C. for 12 hours. The polyoxadiazole polymer is then dissolved in a solvent such as N-methyl-2-pyrrolidone and stirred under $N_2$ atmosphere as one or more substituted phenyl groups and additional PPA are added to the mixture. The reaction produces polytriazole polymers with modifications such as substituted phenyl groups or substituted benzyl groups.

Coated substrates according to embodiments may be prepared by applying a polytriazole polymer, prepared as previously described or according to any other suitable synthetic technique, to a surface of a metal substrate. In an example application, the polytriazole polymer is dissolved in a solvent such as chloroform with magnetic stirring at 25° C. for about 24 hours to form a polymer solution. A metal substrate may then be coated or sprayed with the polymer solution to produce the coated metal substrate. The coated substrate may then be cured via room-temperature solvent evaporation, followed by additional heat drying at 100° C. under vacuum for additional 24 hours.

The metal substrate to which the polytriazole polymer according to the present disclosure may be applied to prevent corrosion may include a metal or metal alloy chosen from iron, iron alloys, aluminum, aluminum alloys, copper, copper alloys, nickel, nickel alloys, lead, or lead alloys. In some embodiments, the metal substrate may be an iron-based steel comprising at least one minor alloying component such as carbon, manganese, silicon, nickel, chromium, molybdenum, tungsten, niobium, vanadium, titanium, or combinations thereof.

EXAMPLES

The following examples illustrate one or more additional features of the present disclosure described previously. It should be understood that these examples are not intended to limit the scope of the disclosure or the appended claims in any manner.

In the following examples, polytriazole polymers were prepared and characterized with respect to physical and thermal properties indicative of the ability to impart corrosion resistance to metal substrates. Metal substrates were coated with a polytriazole polymer prepared in a manner that will be described. The coated metal substrate was then subjected to various tests that provide insight relating to the anti-corrosive properties of the polytriazole polymer. Specifically, a metal substrate was coated with a polytriazole polymer and subjected to water absorption tests, electrochemical impedance spectroscopy (EIS), differential scanning calorimetry (DSC), and water contact angle measurement.

Example 1

Preparation of Polytriazole Polymers 1-10

Polytriazole polymers according to formulas (I)-(IV) as previously described are prepared according to the following general method.

The polytriazole polymers are prepared by a polycondensation reaction between hydrazine sulfate and 4,4'-(hexafluoroisopropylidene)bis(benzoic acid) or 4,4'-oxybis(benzoic acid) along with polyphosphoric acid (PPA) under an inert environment of $N_2$ gas and vigorous stirring for 3 hours at 160° C. The resulting viscous polymer is then precipitated into 5 liters of 1-molar sodium hydroxide (NaOH) solution and washed in de-ionized water at 80° C. for 12 hours. The precipitated polyoxadiazole fibers are collected by filtration and vacuum dried at 110° C. for 12 hours. The polyoxadiazole polymer is then dissolved in N-methyl-2-pyrrolidone solvent and stirred under $N_2$ atmosphere as one or more substituted phenyl groups and PPA is added to the mixture. The reaction produces polytriazole polymers. As the fluorinated diphenylmethane polytriazole polymer is highly soluble in organic solvents, other suitable solvents may include chloroform, dichloromethane, trichloroethylene, N-methyl-2-pyrrolidone, dimethyl acetamide, dimethyl formamide, dimethyl sulfoxide, or combinations thereof.

Polymers 1-10 were prepared according to the foregoing general synthesis and were tested for their physical and chemical properties. Polymers 1-10 had the following structures, in which subscripts m, n, x, and y represent monomer mole fractions within the polymer:

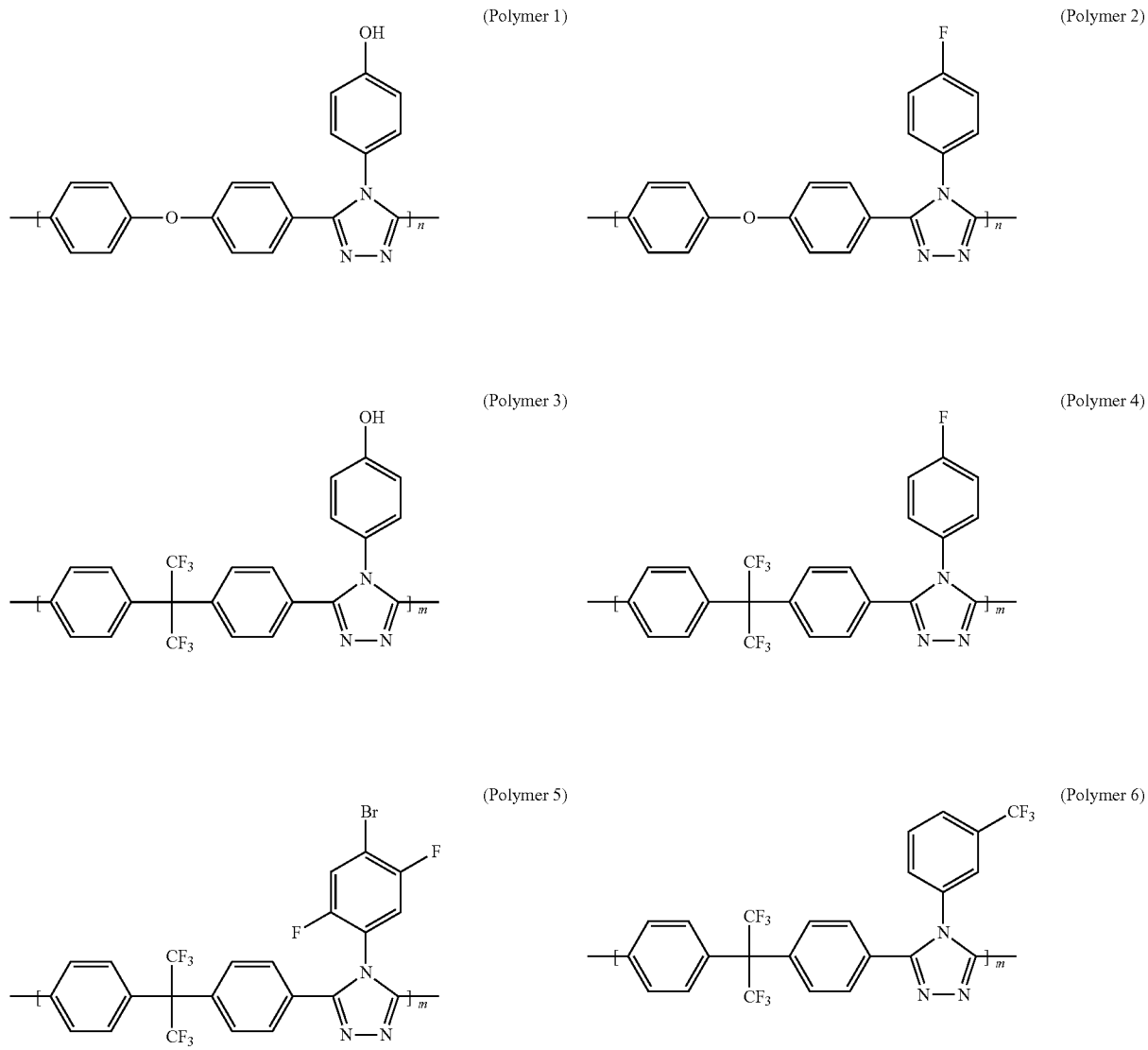

-continued

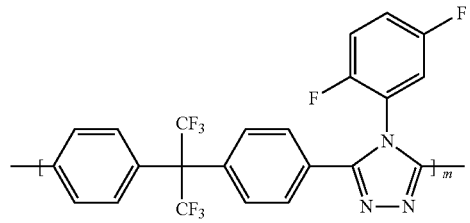
(Polymer 7)

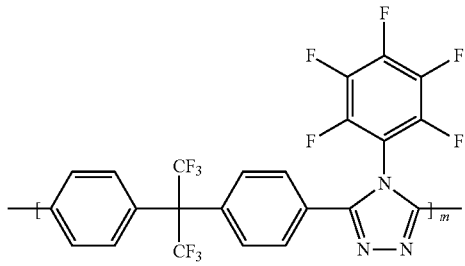
(Polymer 8)

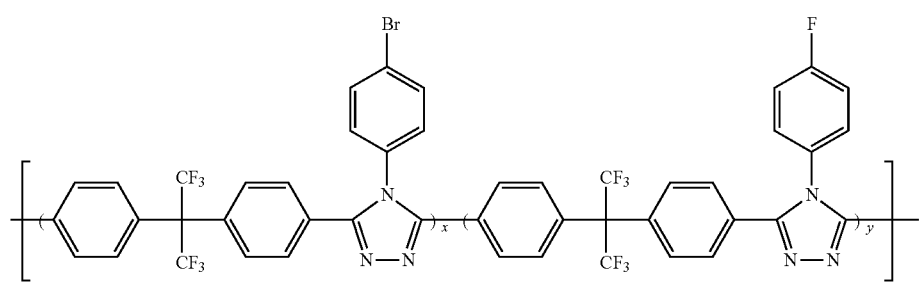
(Polymer 9)

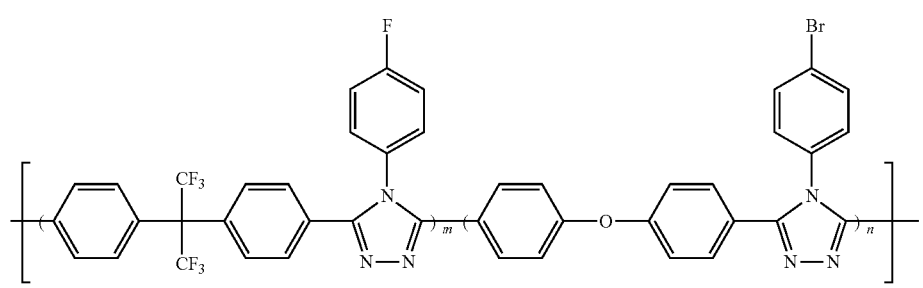
(Polymer 10)

Polymers 1-8 were homopolymers, such that the respective subscripts m and n for each polymer equaled 1. Polymers 9 and 10 were copolymers. In Polymer 9, the subscript x was 0.60 and the subscript y was 0.40. In Polymer 10, the subscript m was 0.52 and the subscript n was 0.48.

Various thermal and physical properties of Polymers 1-10 were determined. The polymers had average molecular weights ($M_w$) from 60 kilograms per mol (kg/mol) to 120 kg/mol, as determined by size exclusion chromatography.

Polydispersity indices (PDI) are calculations of the distribution of molecular weights among many polymer molecules in a given polymer sample. The PDI is directly calculated by the Gel Permeation Chromatography (GPC) techniques used for molecular weight determination of polymer samples. The PDI for Polymers 1-10 were obtained from GPC during the molecular weight determination of each of the polymers. As shown in Table 1, PDI for Polymers 1-10 ranged from 2.1 to 2.6. The maximum PDI among Polymers 1-10 was 2.6. In general, the PDI data indicates relative uniformity of molecular weight distribution in each of Polymers 1-10.

Polymers 1-10 had degrees of polymerization from 60 to 368. The degree of polymerization was calculated by dividing the molecular weight ($M_w$) of the entire polymer by the $M_w$ of the individual polymer unit. The degrees of polymerization for Polymers 1-10 were obtained by dividing the molecular weight of a polymer by the molecular weight of monomeric unit of the same polymer. As shown in Table 1, each of Polymers 1-10 had a degree of polymerization of at least 61. The degree of polymerization data indicates mechanical stability, thermal stability, and chemical stability of each of the polymers.

The thermal stabilities of Polymers 1-10 were further analyzed by thermogravimetric analysis (TGA). All of the polymers exhibited a 5 weight percent (wt. %) loss over the temperature range from 481° C. and 495° C. The char (percent residue) remaining at 650° C. ranged from 48% to 68%.

Table 1 summarizes the thermal and physical properties for all of the prepared polytriazole polymers.

TABLE 1

Thermal and Physical Properties of Polymers 1-10

| Polymer Identification | Molecular Weight ($M_w$) (kg/mol) | Polydispersity ($M_w/M_n$) | Degree of Polymerization (Units) | Degradation Temperature at 5% weight loss of $N_2$ (° C.) | Char Residue Remaining at 650° C. (%) |
|---|---|---|---|---|---|
| Polymer 1  | 120 | 2.1 | 368 | 490 | 60 |
| Polymer 2  | 115 | 2.2 | 350 | 491 | 60 |
| Polymer 3  | 62  | 2.3 | 134 | 488 | 58 |
| Polymer 4  | 70  | 2.1 | 151 | 490 | 58 |
| Polymer 5  | 67  | 2.2 | 119 | 490 | 48 |
| Polymer 6  | 70  | 2.3 | 136 | 488 | 52 |
| Polymer 7  | 64  | 2.3 | 133 | 495 | 56 |
| Polymer 8  | 65  | 2.2 | 122 | 491 | 50 |
| Polymer 9  | 60  | 2.6 | 61  | 481 | 50 |
| Polymer 10 | 105 | 2.6 | 146 | 490 | 68 |

Example 2

Preparation of the Polytriazole Polymer Films for Water Absorption Tests

A homogenous solution was prepared by dissolving 2.0 grams (g) of a polytriazole polymer in 100 g of chloroform (2 wt % solution) by magnetic stirring at about 25° C. for about 24 hours. The solution was poured into petri dishes. Then, the solvent was evaporated from the solution at 25° C. Once the solvent evaporated, the solution was dried under vacuum at 50° C. for 24 hours to produce various polytriazole polymer films. The resulting films were dense, symmetric, flat sheets having thicknesses from 40 micrometers (μm) to 50 μm. No mass loss due to residual solvent was observed during TGA analysis of the films.

Each of the polytriazole polymer films was dried at 100° C. for about 12 hours. The polytriazole polymer films were then submerged in 25° C. distilled water for about 72 hours. The polytriazole polymer films were removed from the water and dried with tissue paper. Then, the weight of the hydrated polytriazole polymer films were measured. Water absorption by the polytriazole polymer films was calculated based on the weight gain of the polymer film in parts per million (ppm) water based on the total weight of the hydrated film, according to Equation 1:

$$\text{Water Absorption (ppm)} = \frac{W2 - W1}{W2} * 10^6 \quad \text{Equation 1}$$

In Equation 1, W1 is the weight of the dried polytriazole polymer film and W2 is the weight of the hydrated polytriazole polymer films. Table 2 summarizes the water absorption amounts for all of the prepared polytriazole polymers.

TABLE 2

Water Absorption Amounts of Polymers 1-10

| Polymer Identification | Water Absorption Amount (ppm) |
|---|---|
| Polymer 1  | 201 |
| Polymer 2  | 153 |
| Polymer 3  | 58  |
| Polymer 4  | 11  |
| Polymer 5  | 5   |
| Polymer 6  | 1   |
| Polymer 7  | 8   |
| Polymer 8  | 6   |
| Polymer 9  | 3   |
| Polymer 10 | 25  |

As shown in Table 2, all of polytriazole polymer films 1-10 absorbed only a negligible amount of water under the test conditions. The negligible water absorption signifies that each of the polytriazole polymer films have good ability to repel water, particularly in coating applications. Without being bound by theory, it is believed that the presence of a triazole ring in each polymer unit provides the polytriazole polymer films with high hydrolytic stability. In addition, the presence of bromine and fluorine atoms in Polymers 2 and 4-10 further enhances the hydrophobic properties of the polytriazole polymer films. These water absorption tests confirm the high hydrophobicity of the polytriazole polymer films, consistent with an ability to repel water when applied to metal substrates.

Example 3

Preparation of the Polytriazole Polymer Films for Water Absorption Tests

Homogenous solutions of Polymers 1-10 were prepared according to Example 2. Then, each of 10 carbon steel coupons (C1018) with dimensions of 7.3 centimeters (cm) by 2.2 cm were coated with a respective one of Polymers 1-10 by solution casting or manual spraying techniques. After applying the polytriazole polymer coating, the carbon steel coupons were dried at 25° C. for about 12 hours followed by heated drying from 50° C. to 100° C. for 24 hours. The polytriazole polymer coatings had final thicknesses from 100 μm to 200 μm.

Each of the carbon steel coupons was subjected to electron ionization spectrometry (EIS) measurement using a Parstat 4000 Potentiostat Galvanostat from Ametek® Scientific Instruments (Berwyn, Pa., USA). The EIS measurements were taken at open-circuit potential at a frequency from 0.01 Hz to $10^5$ Hz with an AC sine signal amplitude of 10 millivolts (mV). The measurements were conducted after the polytriazole polymer coated substrates were exposed to a 3.5 wt % sodium chloride (NaCl) solution at room temperature for 7 days to simulate harsh conditions associated with hydrocarbon production processes. The FIGURE shows EIS results for the carbon steel coupons coated with Polymers 1-10.

Referring to the FIGURE, each of the carbon steel coupons coated with Polymers 1-10 showed varied resistances to corrosion under the applied test conditions. The impedance values for polytriazole Polymers 1-10 at a frequency of 1,000 Hz were all greater than $10^6$ $\Omega/cm^2$. These impedance values are consistent with an ability of polytriazole Polymers 1-10 to provide corrosion resistance to metal substrates. Such high resistive properties of the polytriazole polymers according to the present disclosure may be attributed to the chemical structures of Polymers 1-10.

Example 4

Thermal Stability Properties of the Polytriazole Polymer Films

Dried polytriazole polymer films of each of Polymers 1-10 were prepared as described in Example 2. Each of the polytriazole polymer films was subjected to differential scanning calorimetry (DSC) tests to determine the glass transition temperatures (Tg) of each of the polytriazole polymer films. The DSC tests were conducted according to ASTM E1356, the Standard Test Method for Assignment of the Glass Transition Temperatures by DSC. Table 3 summarizes the Tg of each of the polytriazole polymer films.

TABLE 3

Glass Transition Temperatures (Tg) of Polymers 1-10

| Polymer Identification | Tg (° C.) |
|---|---|
| Polymer 1 | 177 |
| Polymer 2 | 182 |
| Polymer 3 | 235 |
| Polymer 4 | 207 |
| Polymer 5 | 215 |
| Polymer 6 | 201 |
| Polymer 7 | 181 |
| Polymer 8 | 204 |
| Polymer 9 | 191 |
| Polymer 10 | 181 |

As shown in Table 3, every polytriazole polymer film had a Tg of at least 177° C. The Tg of at least 177° C. evidences a thermal stability of the polytriazole polymer films consistent with needs for coatings on metal substrates in industrial applications. In addition, the Tg results are consistent with high stiffness of Polymers 1-10 at temperatures typical in petroleum processing environments. The high stiffness correlates with a relatively low percent elongation and suitable energy dissipation of the materials under stress.

Example 5

Contact Angle Measurements of the Polytriazole Polymer Films

Dried polytriazole polymer films of Polymers 1-10 were prepared as described in Example 2. To confirm the water absorption tests, each of the polytriazole polymer films was additionally subjected to water contact-angle measurements. Table 4 summarizes the contact angle measurements of each of the polytriazole polymer films.

TABLE 4

Contact-Angle Measurements of Polymers 1-10

| Polymer Identification | Contact Angle |
|---|---|
| Polymer 1 | 100° |
| Polymer 2 | 102° |
| Polymer 3 | 104° |
| Polymer 4 | 105° |
| Polymer 5 | 103° |
| Polymer 6 | 110° |
| Polymer 7 | 105° |
| Polymer 8 | 104° |
| Polymer 9 | 108° |
| Polymer 10 | 104° |

As shown in Table 4, water droplets placed on surfaces of the Polymers 1-10 had contact angles from 100° to 110°. These contact angle measurements confirmed that each of the polytriazole polymer films had excellent hydrophobicity, consistent with a need to hinder diffusion of water and other corrosive substances from penetrating the coating and contacting the underlying substrate. As a result, the polytriazole polymers of the present disclosure are expected to exhibit hydrophobicity when applied to metal substrates.

The present disclosure is directed to at least one of the following aspects.

In a first aspect of the present disclosure, a coated substrate may include a metal substrate and a polytriazole polymer on a surface of the metal substrate, the polytriazole polymer having a structure according to formula (I), where $R^1$ and $R^2$ may be independently selected from substituted phenyls according to formula (a) and substituted benzyls according to formula (b), where, in formulas (a) and (b), $X^1$, $X^2$, $X^3$, $X^4$, and $X^5$ may be independently selected from hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy, provided at least one of $X^1$, $X^2$, $X^3$, $X^4$, or $X^5$ is not hydrogen. In this aspect, m and n may represent monomer mole fractions in the polytriazole polymer; m may be from 0 to 1; n may be from 0 to 1; m+n=1; and the polytriazole polymer may have a degree of polymerization from 50 to 400.

A second aspect of the present disclosure may include the first aspect, wherein in each $R^1$ and each $R^2$, exactly one of $X^1$, $X^2$, $X^3$, $X^4$, and $X^5$ may be bromo, fluoro, chloro, iodo, hydroxy, methyl, trifluoromethyl, dimethyl amino, tert-butyl, carboxyl, triphenylmethyl, tris(4-fluorophenyl)methyl, tris(4-methylphenyl)methyl, (4-hydroxyphenyl)diphenylmethyl, or difluoromethoxy, and the remaining four of $X^1$, $X^2$, $X^3$, $X^4$, and $X^5$ may be hydrogen.

A third aspect of the present disclosure may include the first aspect, wherein in each $R^1$ and each $R^2$, exactly two of $X^1$, $X^2$, $X^3$, $X^4$, and $X^5$ may be independently selected from bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, or difluoromethoxy, and the remaining three of $X^1$, $X^2$, $X^3$, $X^4$, and $X^5$ may be hydrogen.

A fourth aspect of the present disclosure may include the first aspect, wherein in each $R^1$ and each $R^2$, exactly three of $X^1$, $X^2$, $X^3$, $X^4$, and $X^5$ may be independently selected from bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, or difluoromethoxy, and the remaining two of $X^1$, $X^2$, $X^3$, $X^4$, and $X^5$ may be hydrogen.

A fifth aspect of the present disclosure may include any of the first through fourth aspects, wherein in each $R^1$ and each $R^2$, $X^1$, $X^2$, $X^4$, and $X^5$ may be independently selected from the group consisting of hydrogen, bromo, chloro, and fluoro, provided at least one of $X^1$, $X^2$, $X^3$, $X^4$, or $X^5$ is not hydrogen.

A sixth aspect of the present disclosure may include any of the first through fifth aspects, wherein $R^1$ and $R^2$ may be independently selected from the group consisting of 4-bromophenyl, 4-hydroxyphenyl, 4-fluorophenyl, 2,4-difluorophenyl, 2,5-difluorophenyl, 4-bromo-2,5-difluorophenyl, 4-bromo-2,6-difluorophenyl, 2-bromo-4-fluorophenyl, 2,6-dibromo-4-fluorophenyl, 3-chloro-5-fluorophenyl, 3-chloro-4-fluorophenyl, 4-fluoro-3-(trifluoromethyl)phenyl, 3-(trifluoromethyl)phenyl, 3,5-dibromo-4-methylphenyl, 3-bromo-4-methylphenyl, 2,4,6-trimethylphenyl, 4-tert-butylphenyl, 4-(dimethylamino)phenyl, 2,3,4,5,6-pentafluorophenyl, 2,4,6-trifluorobenzyl, 3,4,5-trifluorobenzyl, 4-(trifluoromethyl)benzyl, 2,3,4-trifluorobenzyl, 4-fluorobenzyl, 3,5-(di-trifluoromethyl)benzyl, 2,4,6-trimethylbenzyl, 4-methylbenzyl, 4-carboxylbenzyl, 4-(triphenylmethyl)phenyl, 4-[tris(4-fluorophenyl)methyl]phenyl, 4-[tris(4-methylphenyl)methyl]phenyl, 4-[(4-hydroxyphenyl)diphenylmethyl]phenyl, 4-(triphenylmethyl)benzyl, 4-[tris(4-fluorophenyl)methyl]benzyl, 4-[tris(4-methylphenyl)methyl]benzyl, and 4-[(4-hydroxyphenyl)diphenylmethyl]benzyl.

A seventh aspect of the present disclosure may include any of the first through sixth aspects, wherein each $R^1$ and each $R^2$ may be independently selected from the group consisting of 4-bromophenyl, 4-fluorophenyl, 4-hydroxyphenyl, 4-bromo-2,5-difluorophenyl, 3-(trifluoromethyl)phenyl, 2,5-difluorophenyl, and 2,3,4,5,6-pentafluorophenyl.

An eighth aspect of the present disclosure may include any of the first through seventh aspects, wherein $R^1$ and $R^2$ are independently selected from the group consisting of 4-bromophenyl, 4-fluorophenyl, 4-bromo-2,5-difluorophenyl, 3-(trifluoromethyl)phenyl, 2,5-difluorophenyl, and 2,3,4,5,6-pentafluorophenyl.

A ninth aspect of the present disclosure may include any of the first through eighth aspects, wherein $R^1$ may be 4-bromophenyl and $R^2$ may be 4-fluorophenyl.

A tenth aspect of the present disclosure may include any of the first through ninth aspects, wherein the metal substrate comprises a metal or metal alloy chosen from iron, iron alloys, aluminum, aluminum alloys, copper, copper alloys, nickel, nickel alloys, lead, or lead alloys.

An eleventh aspect of the present disclosure may include any of the first through tenth aspects, wherein the metal substrate comprises an iron-based steel comprising at least one minor alloying component chosen from carbon, manganese, silicon, nickel, chromium, molybdenum, tungsten, niobium, vanadium, titanium, or combinations thereof.

A twelfth aspect of the present disclosure may include any of the first through tenth aspects, wherein m may be zero and the polytriazole polymer may have a structure according to formula (II), where $R^2$ is as defined in formula (I) and the polytriazole polymer may have a degree of polymerization from 300 to 400.

A thirteenth aspect of the present disclosure may include the twelfth aspect, wherein each $R^2$ may be selected from the group consisting of 4-bromophenyl and 4-hydroxyphenyl.

A fourteenth aspect of the present disclosure may include any of the first through eleventh aspects, wherein n may be zero and the polytriazole polymer may have a structure according to formula (III), where $R^1$ is as defined in formula (I) and the polytriazole polymer may have a degree of polymerization from 100 to 200.

A fifteenth aspect of the present disclosure may include the fourteenth aspect, wherein each $R^1$ may be selected from the group consisting of 4-hydroxyphenyl, 4-fluorophenyl, 4-bromo-2,5-difluorophenyl, 3-(trifluoromethyl)phenyl, 2,5-difluorophenyl, and 2,3,4,5,6-pentafluorophenyl.

A sixteenth aspect of the present disclosure may include the fourteenth aspect or the fifteenth aspect, wherein the polytriazole polymer may have a structure according to formula (IV), where each $R^{1a}$ and $R^{1b}$ is a group $R^1$ as defined in formula (III), $R^{1a}$ may be different from $R^{1b}$, and x+y=m.

A seventeenth aspect of the present disclosure may include the sixteenth aspect, wherein $R^{1a}$ and $R^{1b}$ may be independently selected from the group consisting of 4-bromophenyl, 4-hydroxyphenyl, 4-fluorophenyl, 2,4-difluorophenyl, 2,5-difluorophenyl, 4-bromo-2,5-difluorophenyl, 4-bromo-2,6-difluorophenyl, 2-bromo-4-fluorophenyl, 2,6-dibromo-4-fluorophenyl, 3-chloro-5-fluorophenyl, 3-chloro-4-fluorophenyl, 4-fluoro-3-(trifluoromethyl)phenyl, 3-(trifluoromethyl)phenyl, 3,5-dibromo-4-methylphenyl, 3-bromo-4-methylphenyl, 2,4,6-trimethylphenyl, 4-tert-butylphenyl, 4-(dimethylamino)phenyl, 2,3,4,5,6-pentafluorophenyl, 2,4,6-trifluorobenzyl, 3,4,5-trifluorobenzyl, 4-(trifluoromethyl)benzyl, 2,3,4-trifluorobenzyl, 4-fluorobenzyl, 3,5-(di-trifluoromethyl)benzyl, 2,4,6-tri methylbenzyl, 4-methylbenzyl, 4-carboxylbenzyl, 4-(triphenylmethyl)phenyl, 4-[tris(4-fluorophenyl)methyl]phenyl, 4-[tris(4-methylphenyl)methyl]phenyl, 4-[(4-hydroxyphenyl)diphenylmethyl]phenyl, 4-(triphenylmethyl)benzyl, 4-[tris(4-fluorophenyl)methyl]benzyl, 4-[tris(4-methylphenyl)methyl]benzyl, and 4-[(4-hydroxyphenyl)diphenylmethyl]benzyl.

An eighteenth aspect of the present disclosure may include the sixteenth aspect or the seventeenth aspect, wherein $R^{1a}$ and $R^{1b}$ may be independently selected from the group consisting of 4-bromophenyl 4-fluorophenyl 4-hydroxyphenyl, 4-bromo-2,5-difluorophenyl 3-(trifluoromethyl)phenyl, 2,5-difluorophenyl, and 2,3,4,5,6-pentafluorophenyl.

A nineteenth aspect of the present disclosure may include any of the sixteenth through eighteenth aspects, wherein $R^{1a}$ and $R^{1b}$ may be independently selected from the group consisting of 4-bromophenyl, 4-fluorophenyl, 4-bromo-2,5-difluorophenyl, 3-(trifluoromethyl)phenyl, 2,5-difluorophenyl, and 2,3,4,5,6-pentafluorophenyl.

A twentieth aspect of the present disclosure may include any of the sixteenth through nineteenth aspects, wherein $R^{1a}$ may be 4-bromophenyl and $R^{1b}$ may be 4-fluorophenyl.

It should be apparent to those skilled in the art that various modifications and variations can be made to the embodiments described herein without departing from the spirit and scope of the claimed subject matter. Thus, it is intended that the specification cover the modifications and variations of the various embodiments described herein provided such modifications and variations come within the scope of the appended claims and their equivalents.

What is claimed is:

1. A coated substrate comprising a metal substrate and a polytriazole polymer on a surface of the metal substrate, the polytriazole polymer having a structure according to formula (I):

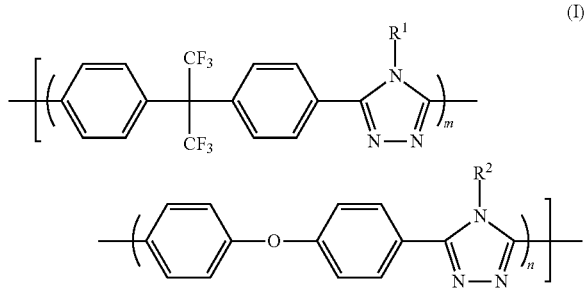

where:
R[1] and R[2] are independently selected from substituted phenyls according to formula (a) and substituted benzyls according to formula (b):

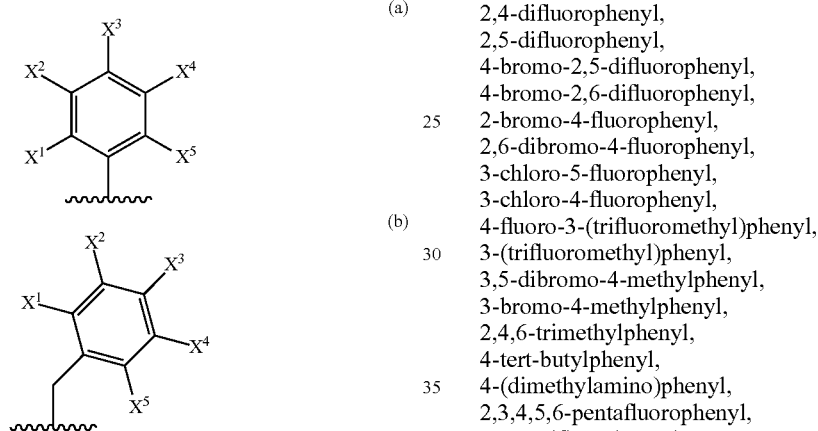

where, in formulas (a) and (b), $X^1$, $X^2$, $X^3$, $X^4$, and $X^5$ are independently selected from hydrogen, bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, and difluoromethoxy, provided at least one of $X^1$, $X^2$, $X^3$, $X^4$, or $X^5$ is not hydrogen;

m and n represent monomer mole fractions in the polytriazole polymer;
m is from 0 to 1;
n is from 0 to 1;
m+n=1; and
the polytriazole polymer has a degree of polymerization from 50 to 400.

2. The coated substrate of claim 1, wherein in each $R^1$ and each $R^2$, exactly one of $X^1$, $X^2$, $X^3$, $X^4$, and $X^5$ is bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, or difluoromethoxy, and the remaining four of $X^1$, $X^2$, $X^3$, $X^4$, and $X^5$ are hydrogen.

3. The coated substrate of claim 1, wherein in each $R^1$ and each $R^2$, exactly two of $X^1$, $X^2$, $X^3$, $X^4$, and $X^5$ are independently selected from bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, or difluoromethoxy, and the remaining three of $X^1$, $X^2$, $X^3$, $X^4$, and $X^5$ are hydrogen.

4. The coated substrate of claim 1, wherein in each $R^1$ and each $R^2$, exactly three of $X^1$, $X^2$, $X^3$, $X^4$, and $X^5$ are independently selected from bromo, fluoro, chloro, iodo, hydroxy, methyl, trifluoromethyl, dimethylamino, tert-butyl, carboxyl, triphenylmethyl, tris(4-fluorophenyl)methyl, tris(4-methylphenyl)methyl, (4-hydroxyphenyl)diphenylmethyl, or difluoromethoxy, and the remaining two of $X^1$, $X^2$, $X^3$, $X^4$, and $X^5$ are hydrogen.

5. The coated substrate of claim 1, wherein in each $R^1$ and each $R^2$, $X^1$, $X^2$, $X^3$, $X^4$, and $X^5$ are independently selected from the group consisting of hydrogen, bromo, chloro, and fluoro, provided at least one of $X^1$, $X^2$, $X^3$, $X^4$, or $X^5$ is not hydrogen.

6. The coated substrate of claim 1, wherein $R^1$ and $R^2$ are independently selected from the group consisting of
4-bromophenyl,
4-hydroxyphenyl,
4-fluorophenyl,
2,4-difluorophenyl,
2,5-difluorophenyl,
4-bromo-2,5-difluorophenyl,
4-bromo-2,6-difluorophenyl,
2-bromo-4-fluorophenyl,
2,6-dibromo-4-fluorophenyl,
3-chloro-5-fluorophenyl,
3-chloro-4-fluorophenyl,
4-fluoro-3-(trifluoromethyl)phenyl,
3-(trifluoromethyl)phenyl,
3,5-dibromo-4-methylphenyl,
3-bromo-4-methylphenyl,
2,4,6-trimethylphenyl,
4-tert-butylphenyl,
4-(dimethylamino)phenyl,
2,3,4,5,6-pentafluorophenyl,
2,4,6-trifluorobenzyl,
3,4,5-trifluorobenzyl,
4-(trifluoromethyl)benzyl,
2,3,4-trifluorobenzyl,
4-fluorobenzyl,
3,5-(di-trifluoromethyl)benzyl,
2,4,6-trimethylbenzyl,
4-methylbenzyl,
4-carboxylbenzyl,
4-(triphenylmethyl)phenyl,
4-[tris(4-fluorophenyl)methyl]phenyl,
4-[tris(4-methylphenyl)methyl]phenyl,
4-[(4-hydroxyphenyl)diphenylmethyl]phenyl,
4-(triphenylmethyl)benzyl,
4-[tris(4-fluorophenyl)methyl]benzyl,
4-[tris(4-methylphenyl)methyl]benzyl, and
4-[(4-hydroxyphenyl)diphenylmethyl]benzyl.

7. The coated substrate of claim 1, wherein each $R^1$ and each $R^2$ are independently selected from the group consisting of
4-bromophenyl,
4-fluorophenyl,
4-hydroxyphenyl,
4-bromo-2,5-difluorophenyl,
3-(trifluoromethyl)phenyl,
2,5-difluorophenyl, and
2,3,4,5,6-pentafluorophenyl.

8. The coated substrate of claim 1, wherein $R^1$ and $R^2$ are independently selected from the group consisting of
4-bromophenyl,
4-fluorophenyl, 4-bromo-2,5-difluorophenyl,
3-(trifluoromethyl)phenyl,
2,5-difluorophenyl, and
2,3,4,5,6-pentafluorophenyl.

9. The coated substrate of claim 1, wherein $R^1$ is 4-bromophenyl and $R^2$ is 4-fluorophenyl.

10. The coated substrate of claim 1, wherein the metal substrate comprises a metal or metal alloy chosen from iron, iron alloys, aluminum, aluminum alloys, copper, copper alloys, nickel, nickel alloys, lead, or lead alloys.

11. The coated substrate of claim 1, wherein the metal substrate comprises an iron-based steel comprising at least one minor alloying component chosen from carbon, manganese, silicon, nickel, chromium, molybdenum, tungsten, niobium, vanadium, titanium, or combinations thereof.

12. The coated substrate of claim 1, wherein m is zero and the polytriazole polymer has a structure according to formula (II):

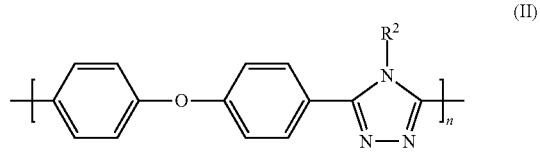

(II)

where:
$R^2$ is as defined in formula (I); and
the polytriazole polymer has a degree of polymerization from 300 to 400.

13. The coated substrate of claim 12, wherein each $R^2$ is selected from the group consisting of 4-bromophenyl and 4-hydroxyphenyl.

14. The coated substrate of claim 1, wherein n is zero and the polytriazole polymer has a structure according to formula (III):

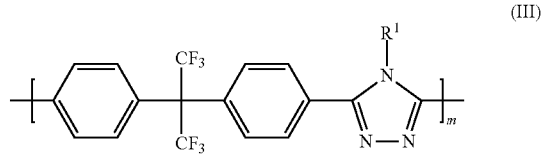

(III)

where:
$R^1$ is as defined in formula (I); and
the polytriazole polymer has a degree of polymerization from 100 to 200.

15. The coated substrate of claim 14, wherein each $R^1$ is selected from the group consisting of
4-hydroxyphenyl,
4-fluorophenyl,
4-bromo-2,5-difluorophenyl,
3-(trifluoromethyl)phenyl,
2,5-difluorophenyl, and
2,3,4,5,6-pentafluorophenyl.

16. The coated substrate of claim 14, wherein the polytriazole polymer has structure according to formula (IV):

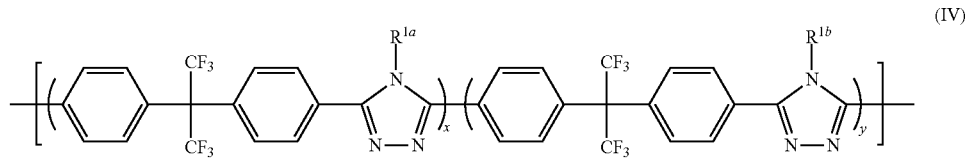

(IV)

where:
each $R^{1a}$ and $R^{1b}$ is a group $R^1$ as defined in formula (III);
$R^{1a}$ is different from $R^{1b}$; and
x+y=m.

17. The coated substrate of claim 16, wherein $R^{1a}$ and $R^{1b}$ are independently selected from the group consisting of
4-bromophenyl,
4-hydroxyphenyl,
4-fluorophenyl,
2,4-difluorophenyl,
2,5-difluorophenyl,
4-bromo-2,5-difluorophenyl,
4-bromo-2,6-difluorophenyl,
2-bromo-4-fluorophenyl,
2,6-dibromo-4-fluorophenyl,
3-chloro-5-fluorophenyl,
3-chloro-4-fluorophenyl,
4-fluoro-3-(trifluoromethyl)phenyl,
3-(trifluoromethyl)phenyl,
3,5-dibromo-4-methylphenyl,
3-bromo-4-methylphenyl,
2,4,6-trimethylphenyl,
4-tert-butylphenyl,
4-(dimethylamino)phenyl,
2,3,4,5,6-pentafluorophenyl,
2,4,6-trifluorobenzyl,
3,4,5-trifluorobenzyl,
4-(trifluoromethyl)benzyl,
2,3,4-trifluorobenzyl,
4-fluorobenzyl,
3,5-(di-trifluoromethyl)benzyl,
2,4,6-trimethylbenzyl,
4-methylbenzyl,
4-carboxylbenzyl,
4-(triphenylmethyl)phenyl,
4-[tris(4-fluorophenyl)methyl]phenyl,
4-[tris(4-methylphenyl)methyl]phenyl,
4-[(4-hydroxyphenyl)diphenylmethyl]phenyl,
4-(triphenylmethyl)benzyl,
4-[tris(4-fluorophenyl)methyl]benzyl,
4-[tris(4-methylphenyl)methyl]benzyl, and
4-[(4-hydroxyphenyl)diphenylmethyl]benzyl.

18. The coated substrate of claim 16, wherein $R^{1a}$ and $R^{1b}$ are independently selected from the group consisting of
4-bromophenyl,
4-fluorophenyl,
4-hydroxyphenyl,
4-bromo-2,5-difluorophenyl,
3-(trifluoromethyl)phenyl,
2,5-difluorophenyl, and
2,3,4,5,6-pentafluorophenyl.

19. The coated substrate of claim 16, wherein $R^{1a}$ and $R^{1b}$ are independently selected from the group consisting of
4-bromophenyl,
4-fluorophenyl,
4-bromo-2,5-difluorophenyl,
3-(trifluoromethyl)phenyl,
2,5-difluorophenyl, and
2,3,4,5,6-pentafluorophenyl.

20. The coated substrate of claim 16, wherein $R^{1a}$ is 4-bromophenyl and $R^{1b}$ is 4-fluorophenyl.

\* \* \* \* \*